US005389131A

United States Patent [19]
Colt et al.

[11] Patent Number: 5,389,131
[45] Date of Patent: Feb. 14, 1995

[54] INK COMPOSITIONS AND PREPARATION PROCESSES THEREOF

[75] Inventors: Richard L. Colt, Rochester; Kurt B. Gundlach, Pittsford, both of N.Y.

[73] Assignee: Xerox Corporation, Stamford, Conn.

[21] Appl. No.: 136,146

[22] Filed: Oct. 15, 1993

Related U.S. Application Data

[63] Continuation-in-part of Ser. No. 992,240, Dec. 19, 1992, Pat. No. 5,258,064.

[51] Int. Cl.$^6$ ............................................. C09D 11/02
[52] U.S. Cl. ............................... 106/20 R; 106/22 R; 106/22 H; 106/20 D
[58] Field of Search ................ 106/20 R, 22 R, 22 H, 106/20 D

[56] References Cited

U.S. PATENT DOCUMENTS

| | | | |
|---|---|---|---|
| 4,259,675 | 3/1981 | Mansukhani | 106/20 D |
| 4,410,364 | 10/1983 | Finlayson et al. | 106/20 B |
| 4,838,940 | 6/1989 | Kan et al. | 106/22 |
| 4,853,037 | 8/1989 | Johnson et al. | 106/22 |
| 4,920,361 | 4/1990 | Arahara et al. | 346/140 R |
| 5,006,170 | 4/1991 | Schwarz et al. | 106/20 D |
| 5,062,892 | 11/1991 | Halko | 106/22 |
| 5,116,411 | 5/1992 | O'Neill et al. | 106/22 R |
| 5,164,232 | 11/1992 | Henseleit et al. | 106/20 D |
| 5,258,064 | 11/1993 | Colt | 106/22 H |

FOREIGN PATENT DOCUMENTS 53-85626 7/1978 Japan.
57-36170 2/1982 Japan.

*Primary Examiner*—Helene Klemanski
*Attorney, Agent, or Firm*—Judith L. Byorick

[57] ABSTRACT

Disclosed is a process for preparing an ink composition which comprises (a) forming a mixture by admixing water and a base; (b) adding a colorant to the mixture; and (c) adjusting the pH of the mixture by adding phosphorous acid thereto. Also disclosed is a process for preparing an ink composition which comprises (a) forming a mixture by admixing water and phosphorous acid; (b) adding a colorant to the mixture; and (c) adjusting the pH of the mixture by adding a base thereto. Further disclosed are ink compositions prepared by these processes. One embodiment is directed to an ink composition which comprises water, a colorant, and phosphorous acid. Another embodiment of the present invention is directed to an ink composition which comprises water, a colorant, and a phosphite salt. Additionally disclosed are processes which comprises incorporating these inks into an ink jet printing apparatus and causing droplets of the ink to be ejected in an imagewise pattern onto a substrate. The presence of phosphorous acid and the base create a buffer system in the ink which adjusts the ink to the desired pH, and also enables improved latency, recoverability, and waterfastness.

56 Claims, No Drawings

INK COMPOSITIONS AND PREPARATION PROCESSES THEREOF

This application is a continuation-in-part of U.S. Ser. No. 07/992,240, Dec. 17, 1992, now U.S. Pat. No. 5,258,064, entitled "Ink Compositions and Application Preparation Process Thereof", the disclosure of which is totally incorporated herein by reference.

BACKGROUND OF THE INVENTION

The present invention is directed to aqueous ink compositions. More particularly, the present invention is directed to ink compositions suitable for use in ink jet printing processes. One embodiment of the present invention is directed to a process for preparing an ink composition which comprises admixing water, a colorant, a base, and phosphorous acid, wherein the pH of the ink is adjusted by a process selected from the group consisting of (a) adding phosphorous acid to an aqueous solution containing the base, and (b) adding the base to an aqueous solution containing phosphorous acid. Another embodiment of the present invention is directed to a process for preparing an ink composition which comprises (a) forming a mixture by admixing water and a base; (b) adding a colorant to the mixture; and (c) adjusting the pH of the mixture by adding phosphorous acid thereto. Yet another embodiment of the present invention is directed to a process for preparing an ink composition which comprises (a) forming a mixture by admixing water and phosphorous acid; (b) adding a colorant to the mixture; and (c) adjusting the pH of the mixture by adding a base thereto. The present invention also includes ink compositions prepared by these processes. One embodiment of the present invention is directed to an ink composition which comprises water, a colorant, and phosphorous acid. Another embodiment of the present invention is directed to an ink composition which comprises water, a colorant, and a phosphite salt.

Ink compositions for ink jet printing are known. For example, U.S. Pat. No. 5,062,892 (Halko) discloses ink jet ink compositions containing oxo anions (phosphates, polyphosphates, phosphate esters, arsenate, molybdate, sulfate, sulfite, and oxalate) in an amount of from 9 milligrams per liter to 14 weight percent. The oxo anion additive is included in the ink to reduce kogation in thermal ink jet printers.

In addition, U.S. Pat. No. 4,853,037 (Johnson et al.) discloses an ink composition for printing on plain paper using a thermal ink jet printer. The ink composition comprises at least one member selected from the group consisting of ethylene glycol and diethylene glycol, present in an amount ranging from about 5 to 10 weight percent, dye, ranging from about 1 to 4 weight percent, and the balance water. A biocide ranging from about 0.01 to 0.3 weight percent and/or a buffering agent, such as sodium borate, sodium hydrogen phosphate, or sodium dihydrogen phosphate, ranging in concentration from about 0.05 to 0.5 weight percent may also be included.

U.S. Pat. No. 4,920,361 (Arahara et al.) discloses an image recording method and an image recording apparatus using an ink which is substantially non-adhesive but can be imparted with an adhesiveness when subjected to a pH change. In the image recording method, the ink is subjected to a pattern of pH change to be provided with an adhesive pattern, which is then transferred to a recording medium, such as plain paper, directly or by the medium of an intermediate transfer medium to form an ink pattern corresponding to the pH change pattern.

U.S. Pat. No. 4,838,940 (Kan et al.) discloses an ink which can be imparted with an adhesiveness on application of an electric current. The ink is obtained by impregnating a crosslinked substance such as guar gum or polyvinyl alcohol compound with a liquid dispersion medium such as water. The ink is supplied with a pattern of energy to be provided with an adhesive pattern, which is then transferred to a recording medium, such as plain paper, directly or by the medium of an intermediate transfer medium to form an ink pattern corresponding to the energy pattern applied. The ink further comprises a buffer action-imparting substance and is excellent in storage stability and stability of performances during a continuous use.

Japanese Patent Publication 53-85626 discloses a water-based ink composition for ball point pens which comprises an aqueous water-soluble dye solution and a pH buffer. The pH buffer is either (i) NaOH and $KH_2PO_4$, (ii) $KH_2PO_4$ and $Na_2HPO_4$, (iii) citric acid and $Na_2HPO_4$, (iv) $KH_2PO_4$ and borax, (v) borax, or (vi) sodium tripolyphosphate, each providing an initial pH of 7 to 9.

Japanese Patent Publication 57-36170 discloses a water-based ink for ink jet printing containing water soluble dyes, a phosphoric ester type surfactant as a humectant, and water.

Copending application U.S. Ser. No. 07/992,240, entitled "ink Compositions and Preparation Processes Thereof," with the named inventor Richard L. Colt, filed Dec. 17, 1992, the disclosure of which is totally incorporated herein by reference, discloses a process for preparing an ink composition which comprises (a) forming a mixture by admixing water and a base; (b) adding a colorant to the mixture; and (c) adjusting the pH of the mixture by adding polyphosphoric acid thereto. Also disclosed is a process for preparing an ink composition which comprises (a) forming a mixture by admixing water and polyphosphoric acid; (b) adding a colorant to the mixture; and (c) adjusting the pH of the mixture by adding a base thereto. Further disclosed are ink compositions prepared by these processes. Additionally disclosed are processes which comprises incorporating these inks into an ink jet printing apparatus and causing droplets of the ink to be ejected in an imagewise pattern onto a substrate. The presence of polyphosphoric acid and the base create a buffer system in the ink which adjusts the ink to the desired pH, and also enables improved latency and waterfastness.

Although known inks are suitable for their intended purposes, a need remains for improved ink compositions suitable for use in ink jet printing processes. In addition, there is a need for ink compositions which exhibit improved latency and recoverability in ink jet printers. Further, there is a need for ink compositions which exhibit improved latency and which also exhibit acceptable waterfastness, pH, viscosity, and surface tension and generate high quality images. Additionally, there is a need for ink compositions with good latency and acceptable pH for which a wide range of solvents is available so that the ink composition can be tailored for compatibility with specific colorants, improved waterfastness, adjusted viscosity, adjusted surface tension, or other important ink characteristics. There is also a need for ink compositions with both improved latency and improved apparent dry times and/or penetration rates into substrates. Further, there is a need for processes for adjusting the pH of aqueous ink compositions containing dyes wherein no crystallization of salts is observed in the pH-adjusted ink. In addition, there is a need for ink compositions for ink jet printing which are stable at pH values of less than about 7.0.

SUMMARY OF THE INVENTION

It is an object of the present invention to provide ink compositions with the above noted advantages.

it is another object of the present invention to provide improved ink compositions suitable for use in ink jet printing processes.

It is yet another object of the present invention to provide ink compositions which exhibit improved latency and recoverability in ink jet printers.

It is still another object of the present invention to provide ink compositions which exhibit improved latency and which also exhibit acceptable waterfastness, pH, viscosity, and surface tension and generate high quality images.

Another object of the present invention is to provide ink compositions with good latency and acceptable pH for which a wide range of solvents is available so that the ink composition can be tailored for compatibility with specific colorants, improved waterfastness, adjusted viscosity, adjusted surface tension, or other important ink characteristics.

Yet another object of the present invention is to provide ink compositions with both improved latency and improved apparent dry times and/or penetration rates into substrates.

Still another object of the present invention is to provide processes for adjusting the pH of aqueous ink compositions containing dyes wherein no crystallization of salts is observed in the pH-adjusted ink.

It is another object of the present invention to provide ink compositions for ink jet printing which are stable at pH values of less than about 7.0.

These and other objects of the present invention (or specific embodiments thereof) can be achieved by providing an ink composition which comprises water, a colorant, and phosphorous acid. Another embodiment of the present invention is directed to an ink composition which comprises water, a colorant, and a phosphite salt. Another embodiment of the present invention is directed to a process for preparing an ink composition which comprises admixing water, a colorant, a base, and phosphorous acid, wherein the pH of the ink is adjusted by a process selected from the group consisting of (a) adding phosphorous acid to an aqueous solution containing the base, and (b) adding the base to an aqueous solution containing phosphorous acid. Yet another embodiment of the present invention is directed to a process for preparing an ink composition which comprises (a) forming a mixture by admixing water and a base; (b) adding a colorant to the mixture; and (c) adjusting the pH of the mixture by adding phosphorous acid thereto. Still another embodiment of the present invention is directed to a process for preparing an ink composition which comprises (a) forming a mixture by admixing water and phosphorous acid; (b) adding a colorant to the mixture; and (c) adjusting the pH of the mixture by adding a base thereto.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidinone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of tile present invention, the liquid vehicle (comprising water plus humectant) is generally present in an amount of from about 60 to about 99.5 percent by weight, and preferably from about 75 to about 99 percent by weight, although the amount can be outside of this range. In a particularly preferred embodiment of the present invention, the liquid vehicle comprises a mixture of water, 2-pyrrolidinone or N-methyl pyrrolidinone, and sulfolane, of the formula

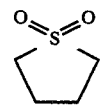

Preferably, the liquid vehicle comprises water in an amount of from about 80 to about 90 parts by weight, sulfolane in an amount of from about 5 to about 10 parts by weight, and 2-pyrrolidinone or N-methyl pyrrolidinone in an amount of from about 5 to about 10 parts by weight, although the relative amounts can be outside this range.

Inks of the present invention contain a colorant. Generally, the colorant is a dye. Preferred dyes are the anionic dyes. Specific examples include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Catodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black 13, Lanasol Red 5B, Lanasol Red B, and Lanasol Yellow 4G, available from Ciba-Geigy, Baslien Black P-BR, Baslien Yellow EG, Basilen Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Basilen Blue E-R, Baslien Brilliant Blue P-3R, Baslien Black P-BR, Basilen Turquoise Blue P-GR, Baslien Turquoise M-2G, Baslien Turquoise E-G, and Baslien Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like. Particularly preferred are dyes available from ICI Americas, Inc. of the chemical structure:

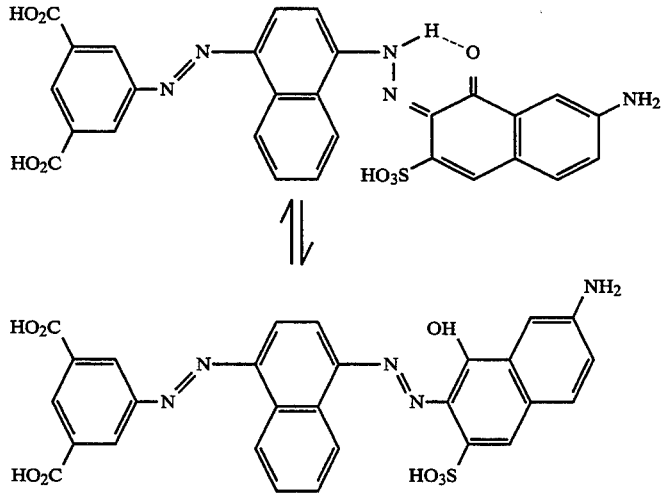

and those of the chemical structure

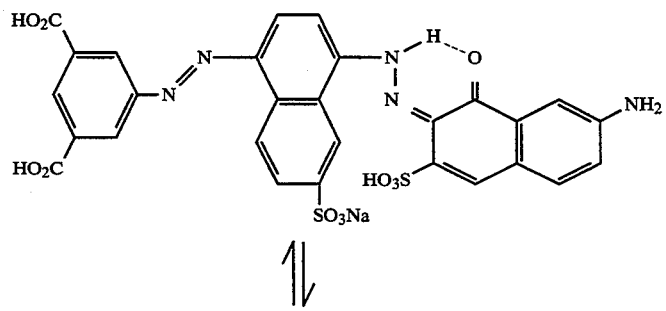

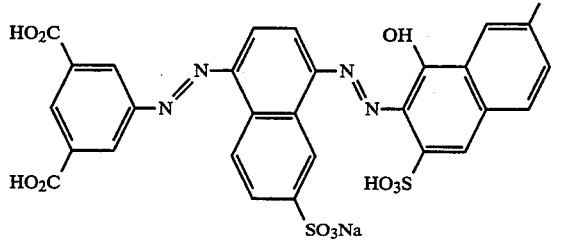

Also particularly preferred are BASF X-34 black dye (available from BASF) and Duasyn Brilliant Red F3B SF VP 218 (high purity solid, obtained from Hoechst, Coventry, R.I.). Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. The dye is present in the ink composition in any effective amount, typically from about 1 to about 20 percent by weight, and preferably from about 2 to about 10 percent by weight (wherein the amount refers to the amount of dye molecules present in the ink), although the amount can be outside of this range. A mixture of dyes in the proportions desired to obtain a specific shade may also be employed.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 0710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight, although the amount can be outside of this range.

Ink compositions of the present invention are buffered to the desired pH by the addition of phosphorous acid and a base. Phosphorous acid is of the formula H$_3$PO$_3$ (often written HPO(OH)$_2$), and is a dibasic acid which dissociates in water, under the appropriate pH conditions, to form the phosphite ions dihydrogen phosphite and monohydrogen phosphite, as follows:

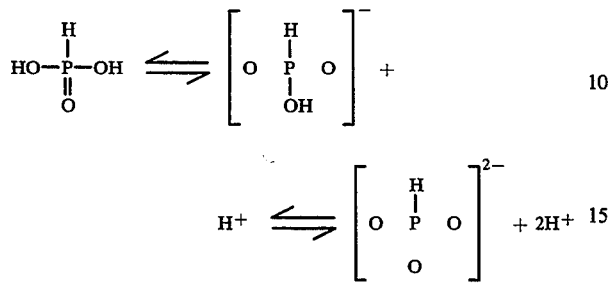

Neutralization of phosphorous acid by bases produces two series of salts, the dihydrogen phosphites, of the formula H$_2$PO$_3^-$, and the monohydrogen phosphites, of the formula HPO$_3^{2-}$. For example, if phosphorous acid is neutralized by an alkali metal hydroxide, such as sodium hydroxide, lithium hydroxide, potassium hydroxide, or the like, dihydrogen phosphite salts such as NaH2PO3, LiH$_2$PO$_3$, KH$_2$PO$_3$, or the like, as well as monohydrogen phosphite salts, such as Na$_2$HPO$_3$, LI2HPO3, K$_2$HPO$_3$, or the like, can be formed. For the purposes of the present invention, the term "phosphite salts" refers both to monohydrogen phosphites and dihydrogen phosphites. Phosphorous acid is commercially available from a number of suppliers, such as Aldrich, Milwaukee, Wis. The phosphorous acid is added to the ink composition in an amount of at least about 0.1 percent by weight of the ink, preferably from about 0.1 to about 10 percent by weight, and more preferably from about 1 to about 2 percent by weight, although the amount can be outside these ranges.

The base can be any suitable base which forms an effective buffer system in the ink in combination with the phosphorous acid. Preferably, the base is sufficiently volatile to leave the liquid vehicle as the ink dries. Examples of suitable bases include ammonia, ammonium hydroxide, methylamine, dimethylamine, trimethylamine, ethylamine, diethylamine, triethylamine, ethylene diamine, and the like, as well as mixtures thereof. The base is added to the ink composition in any effective amount. For example, for a base which is an ammonium hydroxide solution in water (61% NH$_4$OH), typical amounts are at least about 0.1 percent by weight of the ink, preferably from about 0.1 to about 10 percent by weight, and more preferably from about 1 to about 2 percent by weight, although the amount can be outside these ranges. For bases of higher molecular weight, proportionally greater amounts can be used. The amount of base present can also be expressed in terms of the number of molar equivalents of base per molar equivalent of dye in the ink. Typically, the amount of base is from about 0.5 to about 25 molar equivalents of base per molar equivalent of dye, preferably from about 2 to about 10 molar equivalents of base per molar equivalent of dye, although the amount can be outside these ranges.

The various ink ingredients can be admixed with each other in any desired order. For example, the base can be admixed with water, followed by addition of phosphorous acid, followed by addition of the colorant. Or, the base and the colorant can be admixed with water, followed by addition of phosphorous acid. Or, phosphorous acid can be admixed with water, followed by addition of the base, followed by addition of the colorant. Or, phosphorous acid and the colorant can be admixed with water, followed by addition of the base. Any additional ink ingredients, such as solvents, humectants, biocides, or the like, can be added at any desired stage of the ink preparation process.

The buffer system comprising the phosphorous acid and the base enables the ink composition to be adjusted to a stable desired pH, generally within a range of from about 6.5 to about 10.0 and preferably from about 7.5 to about 9.0, although the pH can be outside these ranges. Buffering the pH within these ranges is generally preferred to prevent possible precipitation of the dyes from the ink at pH values lower than about 6.5 and to prevent possible loss of waterfastness and sharp print quality at pH values higher than about 10.0. In some embodiments, it is preferred to adjust the pH of the ink to a value of less than 7.0.

The inks of the present invention, buffered with a combination of phosphorous acid and a base, exhibit improved latency compared to inks buffered with other acids. Latency is the period during which the ink jet printer may stop printing while it contains the ink and subsequently be restarted without clogging of the nozzle. Latency in general should be as high as possible to enable restarting of the ink jet printer after extended idle periods. In most thermal ink jet inks, the choice of ink components in addition to water and colorant, such as glycols or other humectants, determines the latency of the ink. In the inks of the present invention, however, the buffer system enables improved latency; thus, the other ink ingredients can be selected to optimize other important ink characteristics such as waterfastness, viscosity, surface tension, or the like, all of which affect print quality. While not being limited to any particular theory, it is believed that some latency difficulties can arise when salts from an ink buffer system crystallize in or over the nozzles in an ink jet printhead. Crystallization can be reduced or eliminated by selecting ink components which will maintain these crystals in solution, but these ink components may eventually evaporate, leaving the crystals behind to block the nozzles. The combination of phosphorous acid and base in the present invention, however, exhibits minimal tendencies to dry up or crystallize, and enables ink jet printers containing the ink which have been idle for extended periods to restart and jet acceptably with the first pulse. In addition, the combination of phosphorous acid and base in the present invention enhances the waterfastness of the ink. Again, while not being limited to any particular theory, it is believed that the phosphorous acid component in the ink resists crystallization because of the difficulty it would encounter in obtaining the proper geometry for crystal lattice packing. Ammonium phosphite is a highly hygroscopic material which will crystallize if placed in a desiccating oven at 60° C., but will return to liquid at ambient conditions.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

One preferred additive to the inks of the present invention is a polymeric additive consisting of two polyalkylene oxide chains bound to a central bisphenol-A moiety. This additive is of the formula

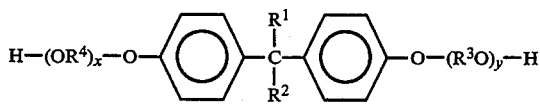

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825 (Schwarz), the disclosure of which is totally incorporated herein by reference.

Ink compositions of the present invention can also contain as optional additives polyamine compounds. Examples of suitable polyamine additives include N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylenehexamine, and the like, as well as mixtures thereof. These materials are commercially available from a variety of sources, including Aldrich Chemical Company, Milwaukee, Wis., Texaco, Inc., Houston, Tex., and Bayer (Canada) Inc., Point Claire, PQ. The polyamine or mixture of polyamines can be present in any effective or desired amount, typically from about 0.001 to about 5 percent by weight of the ink composition, preferably from about 0.01 to about 3 percent by weight of the ink composition, and more preferably from about 0.4 to about 2.0 percent by weight, although the amount can be outside of these ranges.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, additional pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the acid and base pH adjusting components of the present invention to the mixture and mixing at room temperature with moderate shaking until a homogeneous mixture is obtained, typically from about 5 to about 10 minutes. Alternatively, the ink additives of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. To 60.2 grams of deionized water was added 1.03 grams of N,N'-bis(3-aminopropyl)-1,2-ethylenediamine (obtained from BASF/and 2 grams of ammonium hydroxide. The resulting mixture was roll milled for 5 minutes, after which the pH of the mixture was 11.74. Thereafter, 2.91 grams of a 50 percent by weight solution of phosphorous acid (obtained from Rhone-Poulenc) was added to the mixture, which was then roll milled for another 5 minutes, after which the pH was 8.81. Subsequently, to the mixture was added 5 grams of betaine (hygroscopic, obtained from Aldrich Chemical Co.), 12.31 grams of 97 percent by weight sulfolane (obtained from Phillips 66 Company), 10.58 grams of BASF X-34 black dye (obtained from BASF), and 1.93 grams of a solution containing 16.0 percent by weight Direct Red 227 dye (obtained from Tricon Colors), followed by roll milling the mixture for 10 minutes. Thereafter, to the mixture was added 0.05 grams of polyethylene oxide (obtained from Polyscience), followed by roll milling the mixture for 30 minutes. The resulting mixture had a pH of 8.42. To this mixture was added an additional 0.14 grams of a 50 percent by weight solution of phosphorous acid, bringing the pH to 8.18. An additional 4.17 grams of deionized water was added, followed by roll milling for 30 minutes and subsequent filtering to yield an ink composition.

EXAMPLE II

An ink composition was prepared as follows. To 69.76 grams of deionized water was added 1.01 grams of N,N'-bis(3-aminopropyl)-1,2-ethylenediamine (obtained from BASF) and 2.06 grams of ammonium hydroxide. The resulting mixture was roll milled for 5 minutes, after which the pH of the mixture was 11.62. Thereafter, 3.62 grams of a 50 percent by weight solution of phosphorous acid (obtained from Rhone-Poulenc) was added to the mixture, which was then roll milled for another 5 minutes, after which the pH was 8.75. Subsequently, to the mixture was added 8.31 grams of 97 percent by weight sulfolane (obtained from Phillips 66 Company), 10.66 grams of BASF X-34 black dye (obtained from BASF), 1.93 grams of Duasyn Brilliant Red F3B SF VP218 dye (obtained from Hoechst), 0.05 grams of polyethylene oxide (obtained from Polysciences), and 0.099 grams of Dowicil 200 biocide (obtained from Dow Chemical), followed by roll milling the mixture for 15 minutes. The resulting mixture had a pH of 8.47. To this mixture was added an additional 0.19 grams of a 50 percent by weight solution of phosphorous acid, bringing the pH to 8.20. An additional 10.29 grams of deionized water was added, followed by roll milling for 10 minutes and subsequent filtering to yield an ink composition.

For, comparison purposes, an ink composition was prepared by adding to 60.87 grams of deionized water 1.01 grams of of N,N'-bis(3-aminopropyl)-1,2-ethylenediamine (obtained from BASF) and 2.01 grams of ammonium hydroxide. The resulting mixture was roll milled for 5 minutes, after which the pH of the mixture was 11.94. Thereafter, 3.67 grams of a 37 percent by weight solution of hydrochloric acid (obtained from Aldrich Chemical Company) was added to the mixture, which was then roll milled for another 5 minutes, after which the pH was 8.59. Subsequently, to the mixture was added 8.27 grams of 97 percent by weight sulfolane (obtained from Phillips 66 Company), 10.62 grams of BASF X-34 black dye (obtained from BASF), 0.29 grams of Duasyn Brilliant Red F3B SF VP218 dye (obtained from Hoechst), 0.05 grams of polyethylene oxide (obtained from Polysciences), and 0.102 grams of Dowicil 200 biocide (obtained from Dow Chemical), followed by roll milling the mixture for 15 minutes. The resulting mixture had a pH of 8.46. To this mixture was added an additional 0.57 grams of 3 Molar hydrochloric acid, bringing the pH to 8.20. An additional 12.66 grams of deionized water was added, followed by roll milling for 10 minutes and subsequent filtering to yield an ink composition.

The ink compositions thus prepared were each incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition prepared with phosphorous acid began generating high quality images after 1.5 pages of printing had been generated under these conditions. In contrast, the ink prepared with hydrochloric acid began generating high quality images after 6 pages of printing had been generated under these conditions.

EXAMPLE III

An ink composition was prepared as follows. To 17.97 grams of deionized water was added 0.52 grams of N,N'-bis(3-aminopropyl)-1,2-ethylenediamine (obtained from BASF) and 1 gram of ammonium hydroxide. The resulting mixture was roll milled for 5 minutes, after which the pH of the mixture was 12.00. Thereafter, 1.34 grams of a 70 percent by weight solution of phosphorous acid (obtained from Aldrich Chemical Company) was added to the mixture, bringing the pH to 8.10. An additional 0.19 gram of ammonium hydroxide was added, followed by roll milling for another 5 minutes, after which the pH was 8.62. Subsequently, to the mixture was added 12.5 grams of dimethyl sulfoxide (DMSO) (obtained from Baker Chemical Company), 13 grams of Direct Red 227 dye (containing 13.4 percent by weight dye solids, obtained from Tricon Colors), 0.0246 grams of polyethylene oxide (obtained from Polysciences), and 0.0494 grams of Dowicil 200 biocide (obtained from Dow Chemical), followed by roll milling the mixture for 15 minutes. The resulting mixture had a pH of 8.81. To this mixture was added an additional 0.17 grams of a 70 percent by weight solution of phosphorous acid, bringing the pH to 8.19. An additional 3.39 grams of deionized water was added, followed by roll milling for 10 minutes and subsequent filtering to yield an ink composition.

The ink composition thus prepared was incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1 page of printing had been generated under these conditions.

EXAMPLE IV

An ink composition was prepared as follows. To 15.92 grams of deionized water was added 0.52 grams of N,N'-bis(3-aminopropyl)-1,2ethylenediamine (obtained from BASF) and 1 gram of ammonium hydroxide. The resulting mixture was roll milled for 5 minutes, after which the pH of the mixture was 11.60. Thereafter, 1.23 grams of a 70 percent by weight solution of phosphorous acid (obtained from Aldrich Chemical Company) was added to the mixture, followed by roll milling for 5 minutes, bringing the pH to 8.64. Subsequently, to the mixture was added 12.52 grams of dimethyl sulfoxide (DMSO) (obtained from Baker Chemical Company), 15.03 grams of Projet Cyan 1 Liquid dye (containing 10 percent by weight dye solids, obtained from ICI), 0.0255 grams of polyethylene oxide (obtained from Polysciences), and 0.0518 grams of Dowicil 200 biocide (obtained from Dow Chemical), followed by roll milling the mixture for 15 minutes. The resulting mixture had a pH of 8.85. To this mixture was added an additional 0.18 grams of a 70 percent by weight solution of phosphorous acid, bringing the pH to 8.20. An additional 3.61 grams of deionized water was added, followed by roll milling for 10 minutes and subsequent filtering to yield an ink composition.

The ink composition thus prepared was incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1.5 pages of printing had been generated under these conditions.

EXAMPLE V

An ink composition was prepared as follows. To 29.94 grams of deionized water was added 0.52 grams of N,N'-bis(3-aminopropyl)-1,2-ethylenediamine (obtained from BASF) and 1.02 gram of ammonium hydroxide. The resulting mixture was roll milled for 5 minutes, after which the pH of the mixture was 11.43. Thereafter, 1.23 grams of a 70 percent by weight solution of phosphorous acid (obtained from Aldrich Chemical Company) was added to the mixture, followed by roll milling for 5 minutes, bringing the pH to 8.65. Subsequently, to the mixture was added 12.5 grams of dimethyl sulfoxide (DMSO) (obtained from Baker Chemical Company), 1.5 grams of Carolina Direct Yellow 86 dye (obtained from Carolina), 0.0244 grams of polyethylene oxide (obtained from Polysciences), and 0.0503 grams of Dowicil 200 biocide (obtained from Dow Chemical), followed by roll milling the mixture for 15 minutes. The resulting mixture had a pH of 8.87. To this mixture was added an additional 0.17 grams of a 70 percent by weight solution of phosphorous acid, bringing the pH to 8.22. An additional 4.21 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper.

EXAMPLE VI

An ink composition was prepared as follows. To 56.53 grams of deionized water was added 1.02 grams of N,N'-bis(3-aminopropyl)-1,2-ethylenediamine (obtained from BASF) and 2.02 grams of ammonium hydroxide. The resulting mixture was roll milled for 5 minutes, after which the pH of the mixture was 11.62. Thereafter, 2.77 grams of a 70 percent by weight solution of phosphorous acid (obtained from Aldrich Chemical Company) was added to the mixture, followed by roll milling for 5 minutes, bringing the pH to 7.94. Subsequently, to the mixture was added 18.55 grams of 97 percent by weight sulfolane (obtained from Phillips 66 Company), 0.3 gram of Duasyn Brilliant Red dye (obtained from Hoechst), 10.64 grams of BASF X-34 black dye (obtained from BASF), 0.0505 grams of polyethylene oxide (obtained from Polysciences), and 0.0996 grams of Dowicil 200 biocide (obtained from Dow Chemical), followed by roll milling the mixture for 15 minutes. The resulting mixture had a pH of 7.95. To this mixture was added an additional 0.61 grams of a 70 percent by weight solution of phosphorous acid, bringing the pH to 6.98. An additional 7.59 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1.5 pages of printing had been generated under these conditions.

To 20.43 grams of the ink thus prepared was then added an additional 0.1 gram of a 70 percent by weight solution of phosphorous acid, followed by roll milling for 15 minutes and filtering, bringing the pH of the ink composition to 6.53. The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1 page of printing had been generated under these conditions.

Other embodiments and modifications of the present invention may occur to those skilled in the art subsequent to a review of the information presented herein, these embodiments and modifications, as well as equivalents thereof, are also included within the scope of this invention.

What is claimed is:

1. A process for preparing an ink composition which comprises (a) forming a mixture by admixing water and a base; (b) adding a colorant to the mixture; and (c) adjusting the pH of the mixture by adding phosphorous acid thereto.

2. A process according to claim 1 wherein the colorant is a dye.

3. A process according to claim 1 wherein the ink also contains a polyamine.

4. A process according to claim 1 wherein the ink also contains sulfolane.

5. A process according to claim 1 wherein the base is selected from the group consisting of ammonia, ammonium hydroxide, methylamine, dimethylamine, trimethylamine, ethylamine, diethylamine, triethylamine, ethylene diamine, and mixtures thereof.

6. A process according to claim 1 wherein the base is ammonium hydroxide.

7. A process according to claim 1 wherein the base is present in the ink in an amount of at least about 0.1 percent by weight.

8. A process according to claim 2 wherein the base is present in the ink in an amount of at least about 0.5 molar equivalents per molar equivalent of dye.

9. A process according to claim 1 wherein the phosphorous acid is added to the ink an amount of at least about 0.1 percent by weight of the ink.

10. A process according to claim 1 wherein the phosphorous acid is added to the ink in an amount of from about 0.1 to about 10 percent by weight.

11. A process according to claim 1 wherein the pH of the ink is adjusted to a value of from about 6.5 to about 10.0.

12. A process according to claim 1 wherein the pH of the ink is adjusted to a value of less than about 7.0.

13. An ink composition prepared by the process of claim 1.

14. A process for preparing an ink composition which comprises (a) forming a mixture by admixing water and phosphorous acid; (b) adding a colorant to the mixture; and (c) adjusting the pH of the mixture by adding a base thereto.

15. A process according to claim 14 wherein the colorant is a dye.

16. A process according to claim 14 wherein the ink also contains a polyamine.

17. A process according to claim 14 wherein the ink also contains sulfolane.

18. A process according to claim 14 wherein the base is selected from the group consisting of ammonia, ammonium hydroxide, methylamine, dimethylamine, trimethylamine, ethylamine, diethylamine, triethylamine, ethylene diamine, and mixtures thereof.

19. A process according to claim 14 wherein the base is ammonium hydroxide.

20. A process according to claim 14 wherein the base is present in the ink in an amount of at least about 0.1 percent by weight.

21. A process according to claim 15 wherein the base is present in the ink in an amount of at least about 0.5 molar equivalents per molar equivalent of dye.

22. A process according to claim 14 wherein the phosphorous acid is added to the ink an amount of at least about 0.1 percent by weight of the ink.

23. A process according to claim 14 wherein the phosphorous acid is added to the ink in an amount of from about 0.1 to about 10 percent by weight.

24. A process according to claim 14 wherein the pH of the ink is adjusted to a value of from about 6.5 to about 10.0.

25. A process according to claim 14 wherein the pH of the ink is adjusted to a value of less than about 7.0.

26. An ink composition prepared by the process of claim 14.

27. A process for preparing an ink composition which comprises admixing water, a colorant, a base, and phosphorous acid, wherein the pH of the ink is adjusted by a process selected from the group consisting of (a) adding phosphorous acid to an aqueous solution containing the base, and (b) adding the base to an aqueous solution containing phosphorous acid.

28. An ink composition prepared by the process of claim 27.

29. A process which comprises incorporating into an ink jet printing apparatus an ink composition according to claim 13 and causing droplets of the ink composition to be ejected in an imagewise pattern onto a substrate.

30. A process according to claim 29 wherein the ink is selectively heated in an imagewise pattern, thereby causing droplets of the ink to be ejected in an imagewise pattern.

31. A process which comprises incorporating into an ink jet printing apparatus an ink composition according to claim 26 and causing droplets of the ink composition to be ejected in an imagewise pattern onto a substrate.

32. A process according to claim 31 wherein the ink is selectively heated in an imagewise pattern, thereby causing droplets of the ink to be ejected in an imagewise pattern.

33. A process which comprises incorporating into an ink jet printing apparatus an ink composition according to claim 28 and causing droplets of the ink composition to be ejected in an imagewise pattern onto a substrate.

34. A process according to claim 33 wherein the ink is selectively heated in an imagewise pattern, thereby causing droplets of the ink to be ejected in an imagewise pattern.

35. An ink composition which comprises water, a colorant, and phosphorous acid.

36. An ink composition according to claim 35 wherein the colorant is a dye.

37. An ink composition according to claim 35 wherein the ink also contains a polyamine.

38. An ink composition according to claim 35 wherein the ink also contains sulfolane and a member selected from the group consisting of N-methyl pyrrolidone and 2-pyrrolidone.

39. An ink composition according to claim 35 wherein the phosphorous acid is present in the ink an amount of at least about 0.1 percent by weight of the ink.

40. An ink composition according to claim 35 wherein the phosphorous acid is present in the ink in an amount of from about 0.1 to about 10 percent by weight.

41. An ink composition according To claim 35 wherein the pH of the ink is from about 6.5 to about 10.0.

42. An ink composition according to claim 35 wherein the pH of the ink is less than about 7.0.

43. An ink composition which comprises water, a colorant, and a phosphite salt.

44. An ink composition according to claim 43 wherein the colorant is a dye.

45. An ink composition which comprises water, a colorant, and a phosphite salt, wherein the ink also contains a polyamine.

46. An ink composition which comprises water, a colorant, and a phosphite salt, wherein the ink also contains sulfolane.

47. An ink composition according to claim 43 wherein the phosphite salt is present in the ink an amount of at least about 0.1 percent by weight of the ink.

48. An ink composition according to claim 43 wherein the phosphite salt is present in the ink in an amount of from about 0.1 to about 10 percent by weight.

49. An ink composition according to claim 43 wherein the pH of the ink is from about 6.5 to about 10.0.

50. An ink composition according to claim 43 wherein the pH of the ink is less than about 7.0.

51. An ink composition according to claim 43 wherein the phosphite salt comprises a monohydrogen phosphite.

52. An ink composition which comprises water, a colorant, and a phosphite salt, wherein the phosphite salt comprises a dihydrogen phosphite.

53. An ink composition which comprises water, a colorant, and a phosphite salt, wherein the phosphite salt comprises a mixture of a monohydrogen phosphite and a dihydrogen phosphite.

54. A thermal ink jet printing process which comprises incorporating into a thermal ink jet printing apparatus having nozzles for the ejection of ink an ink composition which comprises water, a colorant, and a phosphite salt, and selectively heating the ink in the nozzles in an imagewise pattern, thereby causing droplets of the ink to be ejected in an imagewise pattern.

55. An ink composition which comprises water, a colorant, and a phosphite salt selected from the group consisting of $Na_2HPO_3$, $Li_2HPO_3$, $K_2HPO_3$, and mixtures thereof.

56. An ink composition which comprises water, a colorant, and a phosphite salt present in an amount of from about 1 to about 2 percent by weight.

* * * * *